United States Patent [19]

Funk et al.

[11] Patent Number: 4,586,126
[45] Date of Patent: Apr. 29, 1986

[54] FEED RATE CONTROL

[75] Inventors: Gary L. Funk; James D. Voelkers, both of Bartlesville, Okla.

[73] Assignee: Phillips Petroleum Company, Bartlesville, Okla.

[21] Appl. No.: 597,155

[22] Filed: Apr. 5, 1984

[51] Int. Cl.$^4$ ............................................. G05B 15/00
[52] U.S. Cl. ................................... 364/172; 364/166; 364/510; 364/176; 137/2
[58] Field of Search ............... 364/172, 160, 166, 510, 364/176; 137/2, 13

[56] References Cited

U.S. PATENT DOCUMENTS

| | | | |
|---|---|---|---|
| 3,048,331 | 8/1962 | Van Nice | 235/151 |
| 3,230,154 | 1/1966 | Walker | 203/40 |
| 3,828,171 | 8/1974 | Griffin | 235/151.12 |

Primary Examiner—Jerry Smith
Assistant Examiner—Allen MacDonald
Attorney, Agent, or Firm—French and Doescher

[57] ABSTRACT

In a process in which it is desired to provide P units of feed during a time period ending at time T and in which the available feed has been limited for a part of such time period, method and apparatus is provided for increasing the feed rate when additional feed becomes available so as to provide the total feed P to the process during such time period without subjecting the process to more rapid changes in feed rate than are necessary and without violating process constraints.

6 Claims, 4 Drawing Figures

FEED RATE CONTROL

This invention relates to controlling the flow rate of feed to a process.

The flow of feed to many processes is maintained so as to meet desired production quotas. As an example, if, over a 24 hour period, it is desired to produce 24 units of product and 1 unit of feed is required to produce each unit of product, then 24 units of feed would be provided to the process over a 24 hour period or 1 unit of feed per hour. Where possible, the feed rate in such a case would be maintained at a constant of 1 unit per hour over a 24 hour period to minimize process upsets due to changing feed flow rates.

In many processes, maintaining a constant feed rate is not always possible because enough feed is not always available to meet the constant feed rate. As an example, for the example given, upstream upsets might limit the feed available to one half unit per hour. Also, higher priority demands could result in an allocation of feed to one half unit per hour.

If the factors limiting the feed available are short term (less than 24 hours in the above example) then it is desirable to increase the flow rate of feed above 1 unit per hour when additional feed becomes available so as to meet the desired production schedule. However, at the same time, it is desirable that the process not be subjected to rapid changes in feed rate due to attempts to meet the production objective and there may also be process constraints which limit the rate at which the feed rate can be changed and/or limit the rate at which feed can be supplied to the process.

It is thus an object of this invention to control the flow rate of feed to a process, where the feed rate has been below a feed rate target for a period of time, so as to meet a desired production schedule without subjecting the process to more rapid changes in feed rate than are necessary to meet the production schedule and without violating process constraints.

The invention will be briefly described in conjunction with FIG. 1. Referring now to FIG. 1, the hypothetical example previously described is illustrated. It is assumed that the total feed rate over a 24 hour period should be 24 units but that only one half a unit of feed has been provided for the first 10 hours of the 24 hour period. In accordance with the present invention, a constant acceleration of the feed rate over the remaining 14 hour period, which will result in a total of 24 units of feed being provided to the process over the 24 hour period, is first calculated. The feed rate resulting from such acceleration is illustration as case A in FIG. 2. Use of case A would result in minimum changes in the feed rate per unit time while still meeting the desired feed quota and thus the desired production quota.

It is noted that the final feed rate for case A is about 2.25 units per hour. In some cases, such a feed rate may violate a process constraint or exceed the amount of feed available. In such cases, in accordance with the present invention, the time that a maximum allowable acceleration of the feed rate should be applied is determined and is illustrated as case B in FIG. 2. The maximum allowable acceleration will generally be determined by process constraints.

For case B illustrated in FIG. 2, the maximum allowable acceleration was applied for 4 hours and then the feed rate was held constant as 1.5 units for the remaining 10 hours of the 24 hour period. This resulted in a final feed rate of 1.5 units per hour as compared to the 2.25 units per hour of case A.

In summary for the brief description of the invention, the flow rate of the feed is controlled in accordance with case A or case B as illustrated in FIG. 2 when additional feed becomes available at hour 10. It is also noted that, if case B cannot be used to meet the desired total feed flow rate for the 24 hour period, when operator alarms will be sounded which will enable the operator to set new production quotas at the earliest possible time.

Other objects and advantages of the invention will be apparent from the foregoing brief description of the invention and the claims as well as the detailed description of the invention which follows.

FIG. 1 is a graphical illustration of the effect of the present invention on feed rate to a process;

FIG. 2 is a diagrammatic illustration of an ammonia process to which a natural gas feed is provided and the associated control system of the present invention;

FIG. 3 is an illustration of the computer logic utilized to generate the control signal illustrated in FIG. 2; and FIG. 4 is an illustration of the computer logic utilized to select case A or case B.

The invention is described in terms of an ammonia plant to which natural gas is supplied as a feed. However, the invention is applicable to other processes where it is desired to provide a specified amount of feed over a specified period of time so as to satisfy a desired production quota for the process.

Figure 1:
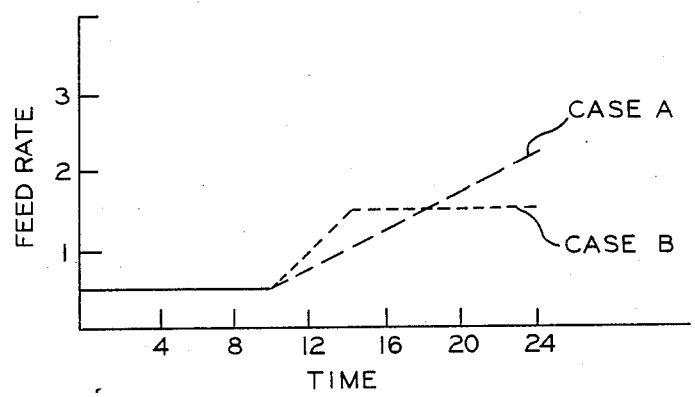
FIGS. 1–4 are utilized in the detailed description of the invention and are briefly described as follows.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that, if a flow is measured in pneumatic form, it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to alculate the required control signals based on measure process parameters as well as set points supplied to th computer. The digital computer is preferably an C ?TROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controller shown may utilize the various modes of control such as proportional, proportional-integral, proportional-derivative, or proportional-integral-derivative. In this preferred embodiment, a proportional-integral-derivative controller is utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output in the present invention is a signal representative of a valve position necessary to make the desired and actual flows equal.

Figure 2:
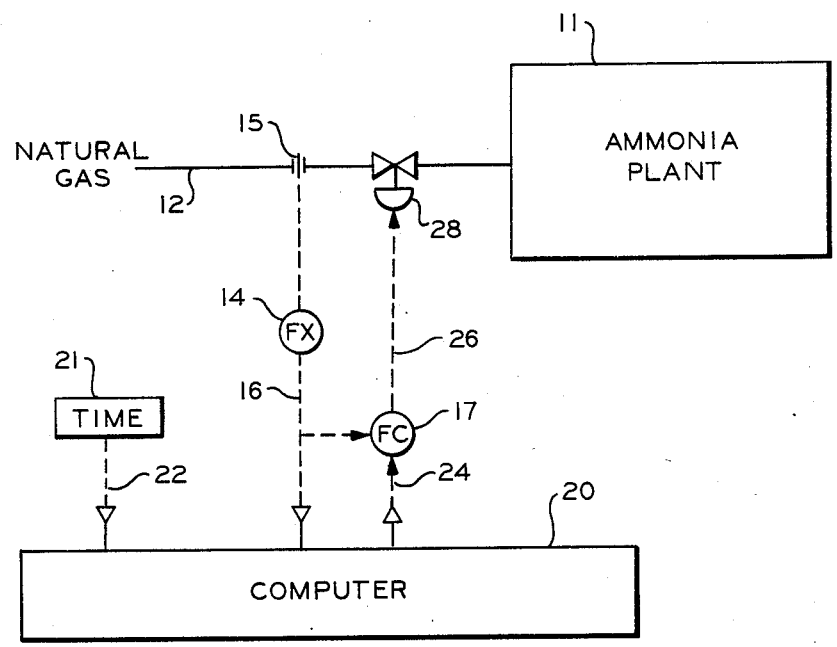

Referring now to FIG. 2, there is illustrated an ammonia plant 11 to which a natural gas feed is supplied through conduit 12. The amount of the natural gas feed available may vary because of upsets in the process being utilized to produce the natural gas, or the pipelines shipping the natural gas. Also, during periods of cold weather, priorities for home heating systems may limit the amount of natural gas available for an industrial process such as an ammonia plant.

Flow transducer 14 in combination with the flow sensor 15, which is operably located in conduit means 12, provides an output signal 16 which is representative of the actual flow rate of the natural gas flowing through conduit 12. Signal 16 is provided from the flow transducer 14 as the process variable input to the flow controller 17 and also as a process input to computer 20.

Block 21 is representative of time into a production period. Signal 22, which is representative of elapsed time, is provided from block 21 as a second process input to computer 20. The time represented by signal 22 would typically be initialized by an operator.

In response to the described process input signals and to other limits and set points which will be described more fully hereinafter, computer 20 provides an output signal 24 which is representative of the desired flow rate of the natural gas flowing through conduit 12. Signal 24 is supplied as the set point input to the flow controller 17.

In response to signal 16 and 24, the flow controller 17 provides an output signal 26 which is responsive to the difference between signals 16 and 24. Signal 26 is scaled so as to be representative of the position of the control valve 28, which is operably located in conduit means 12, required to maintain the actual flow rate of natural gas through conduit means 12 substantially equal to the desired flow rate represented by signal 24. Signal 26 is provided as a control signal from the flow controller 17 to the control valve 28 and control valve 28 is manipulated in response thereto.

The magnitude of signal 24 during the first 10 hours illustrated in FIG. 1 would not be set by computer logic but would rather be set by an operator at the maximum available feed rate. Such setting is not described fully hereinafter since, while the initial 10 hours of operation in FIG. 1 have caused the situation which requires control in accordance with the present invention, control of the feed rate during the first 10 hours is not a part of the present invention.

After the tenth hour in FIG. 1, signal 24 would be calculated by the computer logic which will be described hereinafter. It is noted that the magnitude of signal 24 would be updated periodically based on the calculation period. Usually the calculation period would range from about 30 minutes to about 1 hour which results in a "stair-stepping" of the feed flow rate set point signal 24. However, if desired, the updating could be done on a very short cycle such that the magnitude of signal 24 would change on a virtually continuous basis.

To illustrate the present invention, an updating period of 1 hour will be considered. Thus, for purposes of the following discussion, the tenth hour in FIG. 1 will be considered time $T_1$, the eleventh hour will be considered time $T_2$ with each hour thereafter being designated by increasing the subscripts such that the fourteenth hour will be time $T_5$. Also, the twenty fourth hour will be considered the total production period or time T.

Figure 3:
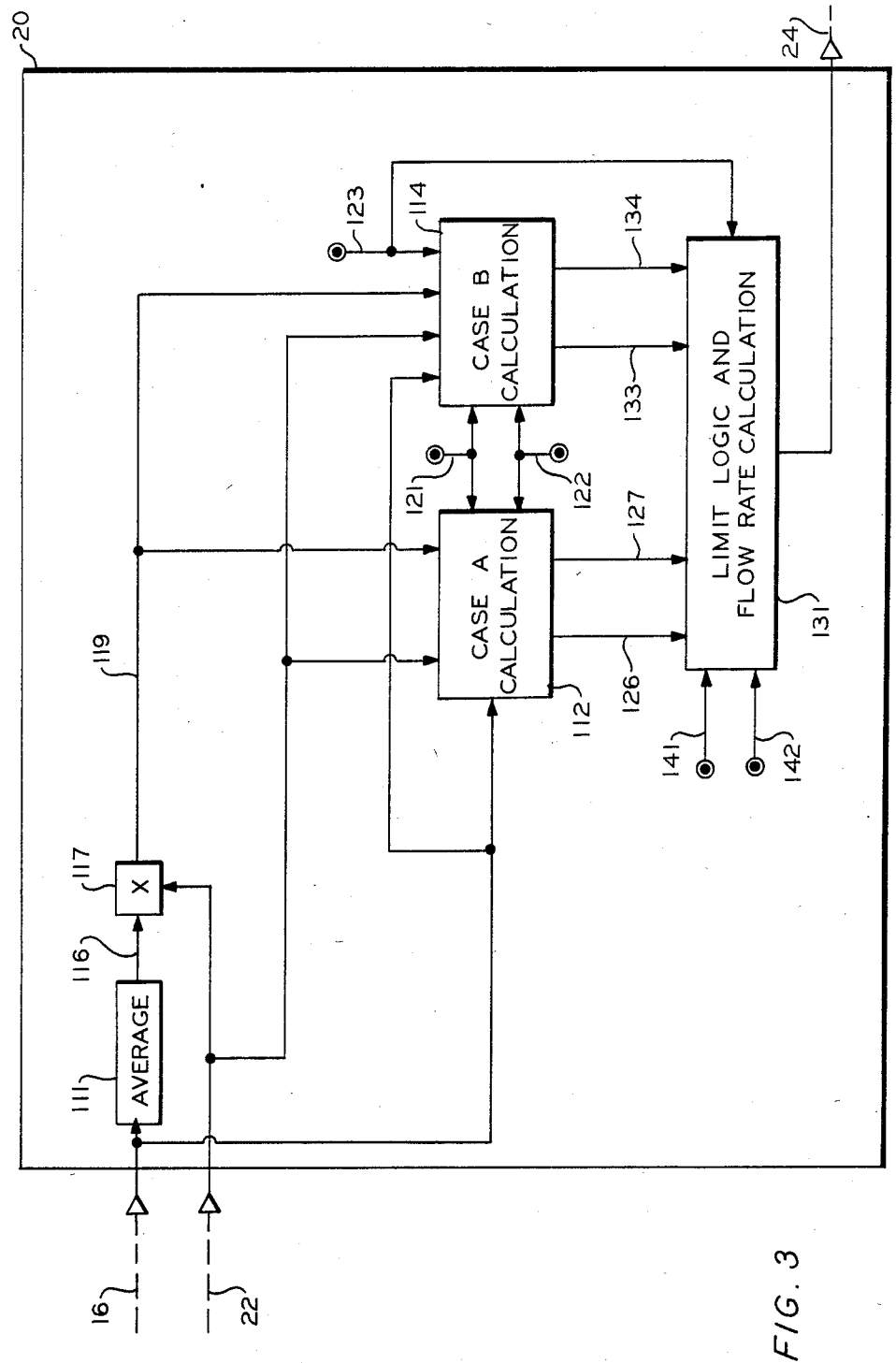

At time $T_1$ the computer logic would be initialized by the operator based on the fact that additional feed is now available at time $T_1$. Referring now to FIG. 3 in which the computer logic is illustrated, signal 16, which will be representative of the current value of the actual feed rate ($V_1$), is supplied as an input to the averaging block 111 and also as an input to the case A calculation block 112 and the case B calculation block 114.

Signal 16 will have been provided to the averaging block 111 since the beginning of the 24 hour period illustrated in FIG. 1. Based on a periodic sampling of this feed rate, the averaging block 111 provides an output signal 116 which is representative of the average feed rate during the first 10 hours illustrated in FIG. 1. Signal 116 is supplied from the averaging block 111 as a first input to the multiplying block 117.

Signal 22, which is representative of the total elapsed time (10 hours at time $T_1$), is supplied as a second input to the multiplying block 117 and is also supplied as an input to the case A calculation block 112 and the case B calculation block 114. Signal 116 is multiplied by signal 22 to establish signal 119 which is representative of the total amount of feed ($P_1$) which has been supplied to the ammonia process 11 illustrated in FIG. 2 during the first 10 hours of the 24 hour period illustrated in FIG. 1. Signal 119 is supplied from the multiplying block 117 to both the case A calculation block 112 and the case B calculation block 114.

Both the case A calculation block and the case B calculation block are also supplied with two signals 121 and 122. Signal 121 is representative of the total amount of feed (P) which should be supplied to the ammonia process 11 during the 24 hour period illustrated in FIG. 1. Signal 122 is representative of the production period (T) which, for the present illustration, is 24 hours as illustrated in FIG. 1.

Signal 123, which is representative of the maximum allowable acceleration (g), is provided as an input to both the case B calculation block 114 and the limit logic and flow rate calculation block 131. The magnitude of g will generally be determined by process constrain' :. For an ammonia process, the magnitude of g woi 1 generally be limited by compressor characteristics.

Based on the described inputs, the case A calculati n block provides two output signals 126 and 127. Sigi al 126 is representative of the acceleration which should be applied to the feed rate in order to increase the feed rate at a substantially constant rate as is illustrated for case A in FIG. 1. Signal 127 is representative of the final feed rate which would be achieved in case A at the end of 24 hours. Signal 126 and 127 are supplied from the case A calculation block 112 to the limit logic and flow rate calculation block 131. The manner in which signals 126 and 127 are calculated is as follows.

The total feed supplied to the ammonia process in case A illustrated in FIG. 1 is given by $$P = P_1 + V_1(T - T_1) + \int_0^{T-T_1} a(t)dt \quad (1)$$

where a = the acceleration applied to the feed between time $T_1$ and time T and all other variables are as previously defined. Solving for the unknown quantity a gives $$a = \frac{2((P - P_1) - V_1(T - T_1))}{(T - T_1)^2}. \quad (2)$$

The solution to equation 2 provides the magnitude of signal 126.

Once a is known from equation 2, the magnitude of signal 127 ($V_{FA}$, the final feed rate at time T) may be calculated in accordance with equation 3

$$V_{FA} = V_1 + a(T - T_1). \quad (3)$$

In a similar manner, the case B calculation block 114 provides 2 output signals 133 and 134 in response to the described inputs to the case B calculation block 114. Signal 133 is representative of the amount of time that the acceleration g must be applied ($T_5 - T_1$ in the example of FIG. 1). Signal 134 is representative of the final feed rate at the end of 24 hours for case B. Signals 133 and 134 are provided from the case B calculation block 114 as inputs to the limit logic and flow rate calculation block 131. The manner in which signals 133 and 134 are calculated are as follows.

The total feed P provided to the ammonia process in case B illustrated in FIG. 2 is given by equation 4

$$P = P_1 + \tfrac{1}{2}g(T_5 - T_1)^2 + V_1(T_5 - T_1) + (V_1 + g(T_5 - T_1))(T - T_5) \quad (4)$$

where all variables are as previously defined. The only unknown is the amount of time that the acceleration g should be applied which will give a value for $T_5$. The value for $T_5$ is given by equation 5

$$T_5 = T - \sqrt{\frac{2}{g}(P_1 - P) + \frac{1}{2}g(T - T_1)^2 + V_1(T - T_1)}. \quad (5)$$

Thus, solving equation 5 provides the magnitude for signal 133.

Once the value of $T_5$ is known, the final feed rate in case B is given by equation 6

$$V_{FB} = V_1 + g(T_5 - T_1). \quad (6)$$

Solving equation 6 gives the magnitude of signal 134.

In addition to the previously described inputs, the limit logic and flow rate calculation block 131 is supplied with two set point signals 141 and 142. Signal 141 is representative of a minimum allowed flow rate ($V_{min}$). Signal 142 is representative of a maximum allowed flow rate ($V_{max}$).

In response to the described inputs, the limit logic and flow rate calculation block 131 provides an output signal 24 which is representative of the desired flow rate of the natural gas flowing through conduit means 12 illustrated in FIG. 2. Signal 24 will be updated periodically as will be described more fully hereinafter and is utilized as previously described. The manner in which signal 24 is calculated is illustrated in FIG. 4.

Figure 4:
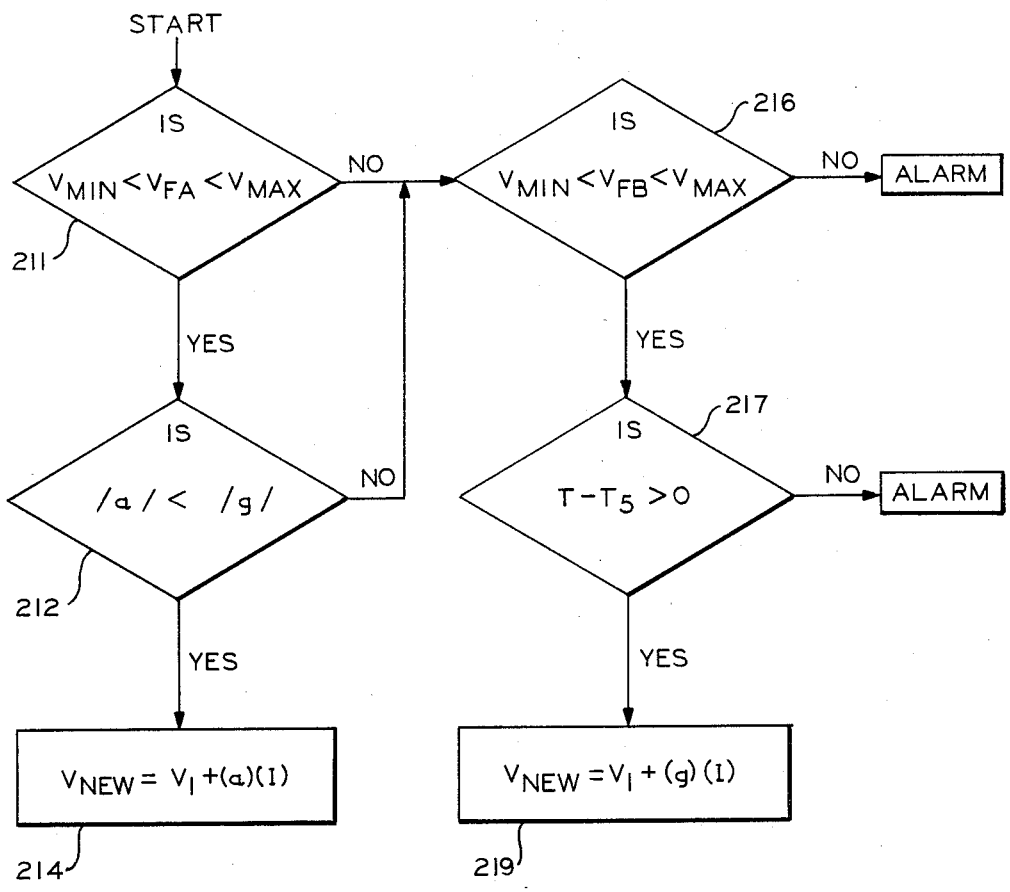

Referring now to FIG. 4, the decision block 211 is utilized to determine if the final flow rate ($V_{FA}$) for case A is within desired limits. If the answer is no, then the logic on the right hand side of the logic diagram (case B) illustrated in FIG. 4 is activated as will be described more fully hereinafter.

If the answer is yes in decision block 211, then decision block 212 is utilized to determine if the absolute value of the acceleration (a) is less than the limiting acceleration g. Again, if the answer is no, the right hand side of the logic diagram is activated. However, if the answer is yes, then a new velocity or feed rate is calculated in block 214. I in the equation in block 214 is representative of the calculation interval which has been assumed to be one hour. Thus, $V_{new}$ in the first pass through the computer will be equal to the flow rate of the natural gas through conduit means 12 at time $T_2$. This flow rate set point will be held from time $T_1$ to time $T_2$ by setting signal 24 equal to $V_{new}$ as calculated in block 214.

If the answer in either block 211 or block 212 is no, then case B is examined. Decision block 216 is utilized to determine if the final flow rate for case B is within desired limits. If the answer is no, then an alarm is set to alert the operator that the total feed requirements for the ammonia process over the 24 hour period cannot be met. If the answer is yes, then decision block 217 is utilized to determine if there is sufficient time left for the acceleration g to enable the total feed specification for the 24 hour period to be met. If the answer is no, then an alarm is again set since the total feed specification cannot be met. If the answer is yes, then a new feed flow rate is calculated in block 219. Again, I in the equation of block 219 is representative of the calculation interval.

In summary with respect to FIG. 4, case A is first examined. If case A can be utilized to meet the total feed specification, block 214 is utilized to set the magnitude of signal 24. However, if case A cannot be utilized, case B is examined and block 219 is utilized to set the magnitude of signal 24 if case B can be utilized to meet the desired feed specification for the 24 hour period. If case B cannot be utilized, then alarms are set to alert the operator to the fact that the production and feed schedules must be changed.

As has been previously stated, the calculations illustrated in FIGS. 3 and 4 will be repeated at time $T_2$. At this time, the magnitude of $P_1$ will have changed and $V_1$ will be the actual flow rate at time $T_2$. All references to $T_1$ will be changed to $T_2$ in the equations. A new acceleration will be calculated and new final flow rates will be calculated as well as a new time for application of the acceleration g in case B. Signal 24 would then again be updated as previously described in FIG. 4 using the new calculated values.

It is noted that, if the feed rate stayed precisely on the lines illustrated in FIG. 1, the acceleration A and the time $T_5$ would not change. However, since the calculation of the magnitude of signal 24 is not continuous and since, in a real process, there would be some variation in the feed flow rate, there would generally be some change in the calculated values. However, the result of control in accordance with the present invention will be the achieving of a total desired feed flow to the process over the 24 hour period if such feed flow can be achieved.

The invention has been described in terms of a preferred embodiment. Many variations are possible within the scope of the present invention and such variations are considered to be within the present invention, as claimed. Examples of variations are changing the interval for the calculations, changing the total time for meeting the feed quota and other similar changes which would be at the discretion of an operator.

That which is claimed is:

1. Apparatus for controlling the flow of feed to a process, wherein it is desired to supply P units of feed to said process during a first time period which ends at a time T, wherein the feed rate for a part of said first time period has been limited such that, if such limited feed rate were used for said first time period, P units of feed would not be supplied to said process during said first time period and wherein, at a time $T_1$, additional feed is available to be supplied to said process, said apparatus comprising:

means for establishing a first signal representative of the actual flow rate ($V_1$) of said feed to said process at said time $T_1$;

means for establishing a second signal representative of the total amount of feed which has been supplied to said process during said first time period at said time $T_1$;

means for establishing a third signal representative of the acceleration (a) which should be applied to the feed rate at said time $T_1$ over a second time period $T-T_1$ in order to supply P units of feed during said first time period and also provide a substantially constant increase in the feed rate between said time $T_1$ and said time T in response to the magnitude of P, T, said first signal and said second signal;

means for establishing a fourth signal representative of the final feed rate at said time T if the acceleration represented by said third signal is applied to the flow rate represented by said first signal over said second time period;

means for establishing a fifth signal representative of the maximum allowable acceleration (g) of the feed rate to said process;

means for establishing a time $T_5$ wherein $T_5-T_1$ is representative of the length of time which the acceleration g must be applied to the feed rate represented by said first signal in order to supply P units of feed to said process during said first time period;

means for establishing a seventh signal representative of the feed rate at said time T if said acceleration g is applied to the flow rate represented by said first signal between said time $T_1$ and said time $T_5$;

means for establishing an eighth signal representative of the desired feed rate at a time $T_2$, which is later in time than said time $T_1$, in response to said first signal, said third signal and said fifth signal, wherein $T_2-T_1$ is the calculation interval between the calculation of new magnitude for said eighth signal, wherein the magnitude of said eighth signal is given by $V_1+(a)(T_2-T_1)$ if the magnitude of said fourth signal is not greater than the maximum allowed feed rate for said process ($V_{ax}$) and the absolute value of a is less than the absolute value of g and wherein the magnitude of said eighth signal is given by $V_1+(g)(T_2-T_1)$ if the magnitude of said fourth signal is greater than $V_{max}$ or if the absolute value of a is greater than the absolute value of g, $T-T_5$ is greater than zero and the magnitude of said seventh signal is less than $V_{max}$; and means for manipulating the flow rate of feed to said process in response to said eighth signal.

2. Apparatus in accordance with claim 1 wherein the magnitude of said first, second, third, fourth, sixth, seventh and eighth signals is updated periodically with the next update occuring at time $T_2$ with time $T_1$ for said first, second, third, fourth, sixth, seventh and eighth signals becoming time $T_2$ and time $T_2$ becoming $T_2+(T_2-T_1)$.

3. Apparatus in accordance with claim 2 wherein said means for manipulating the flow rate of said feed in response to said eighth signal comprises:

a control valve operably located so as to control the flow of said feed;

means for comparing said first signal and said eighth signal and for establishing a ninth signal which is responsive to the difference between said first signal and said eighth signal, wherein said ninth signal is scaled so as to be representative of the position of said control valve required to maintain the actual feed rate substantially equal to the desired feed rate represented by said eighth signal; and means for manipulating said control valve in response to said ninth signal.

4. A method for controlling the flow of feed to a process, wherein it is desired to supply P units of feed to said process during a first time period which ends at a time T, wherein the feed rate for a part of said first time period has been limited such that, if such limited feed rate were used for said first time period, P units of feed would not be supplied to said process during said first time period and wherein, at a time $T_1$, additional feed is available to be supplied to said process, said method comprising the steps of:

establishing a first signal representative of the actual flow rate ($V_1$) of said feed to said process at said time $T_1$;

establishing a second signal representative of the total amount of feed which has been supplied to said process during said first time period at said time $T_1$;

establishing a third signal representative of the acceleration (a) which should be applied to the feed rate at said time $T_1$ over a second time period $T-T_1$ in order to supply P units of feed during said first time period and also provide a substantially constant increase in the feed rate between said time $T_1$ and said time T in response to the magnitude of P, T, said first signal and said second signal;

establishing a fourth signal representative of the final feed rate at said time T if the acceleration represented by said third signal is applied to the flow rate represented by said first signal over said second time period;

establishing a fifth signal representative of the maximum allowable acceleration (g) of the feed rate to said process;

establishing a time $T_5$ wherein $T_5-T_1$ is representative of the length of time which the acceleration g must be applied to the feed rate represented by said first signal in order to supply P units of feed to said process during said first time period;

establishing a seventh signal representative of the feed rate at said time T if said acceleration g is applied to the flow rate represented by said first signal between said time $T_1$ and said time $T_5$;

establishing an eighth signal representative of the desired feed rate at a time $T_2$, which is later in time than said time $T_1$, in response to said first signal, said third signal and said fifth signal, wherein $T_2-T_1$ is the calculation interval between the calculation of new magnitudes for said eighth signal, wherein the magnitude of said eighth signal is given by $V_1+(a)(T_2-T_1)$ if the magnitude of said fourth signal is not greater than the maximum allowed feed rate for said process ($V_{max}$) and the absolute value of a is less than the absolute value of g and wherein the magnitude of said eighth signal is given by $V_1+(g)(T_2-T_1)$ if the magnitude of said fourth signal is greater than $V_{max}$ or if the absolute value of a is greater than the absolute value of g, $T-T_5$ is greater than zero and the magnitude of said seventh signal is less than $V_{max}$; and manipulating the flow rate of feed to said process in response to said eighth signal.

5. A method in accordance with claim 4 additionally comprising the step of updating the magnitude of said first, second, third, fourth, sixth, seventh and eighth signals periodically with the next update occuring at time $T_2$ with time $T_1$ for said first, second, third, fourth, sixth, seventh and eighth signals becoming time $T_2$ and time $T_2$ becoming $T_2+(T_2-T_1)$.

6. A method in accordance with claim 5 wherein said step of manipulating the flow rate of said feed in response to said eighth signal comprises:

comparing said first signal and said eighth signal and establishing a ninth signal which is responsive to the difference between said first signal and said eighth signal, wherein said ninth signal is scaled so as to be representative of the position of a control valve, operably located so as to control the flow of said feed, required to maintain the actual feed rate substantially equal to the desired feed rate represented by said eighth signal; and manipulating said control valve in response to said ninth signal.

* * * * *